(12) United States Patent
Athale (10) Patent No.: US 9,141,719 B2
(45) Date of Patent: Sep. 22, 2015

(54) SYSTEMS AND METHODS FOR ADVANCED TARGETING

(75) Inventor: Anant Athale, Cave Creek, AZ (US)

(73) Assignee: AMERICAN EXPRESS TRAVEL RELATED SEVICES COMPANY, INC., New York, NY (US)

( * ) Notice: Subject to any disclaimer, the term of this patent is extended or adjusted under 35 U.S.C. 154(b) by 72 days.

(21) Appl. No.: 13/436,579

(22) Filed: Mar. 30, 2012

(65) Prior Publication Data

US 2013/0262658 A1 Oct. 3, 2013

(51) Int. Cl.
*G06F 15/173* (2006.01)
*G06F 17/30* (2006.01)

(52) U.S. Cl.
CPC .................. *G06F 17/3089* (2013.01)

(58) Field of Classification Search
CPC ... H04L 12/2492; H04L 67/02; G06F 15/173; G06F 17/00
USPC ..................... 709/224; 705/35–44
See application file for complete search history.

(56) References Cited

U.S. PATENT DOCUMENTS

| | | | | |
|---|---|---|---|---|
| 7,739,594 B2* | 6/2010 | Vasilik | ........................ | 715/277 |
| 7,958,204 B1* | 6/2011 | Phillips et al. | ................ | 709/219 |
| 7,975,000 B2* | 7/2011 | Dixon et al. | .................. | 709/203 |
| 8,296,643 B1* | 10/2012 | Vasilik | ......................... | 715/200 |
| 8,321,343 B2* | 11/2012 | Ramavarjula et al. | .......... | 705/40 |
| 2004/0088355 A1* | 5/2004 | Hagan et al. | .................. | 709/203 |
| 2008/0052668 A1* | 2/2008 | Craig et al. | ................... | 717/111 |
| 2011/0231778 A1* | 9/2011 | Hoag et al. | .................... | 715/745 |

* cited by examiner

*Primary Examiner* — Vivek Srivastava
*Assistant Examiner* — Karina J Garcia-Ching
(74) *Attorney, Agent, or Firm* — Snell & Wilmer L.L.P.

(57) ABSTRACT

A system for testing the effectiveness of webpage configurations is disclosed. Tags indicating dependency between sections of a webpage may be associated with the sections. In response to a version of a first section of a webpage being tested, an associated tag may indicate that the content or behavior of a second section is dependent on the first section. A webpage configuration including content of the first section, and corresponding behavior and content of the second section, may be transmitted to a web client. Data may be collected indicating the effectiveness of the webpage configuration.

20 Claims, 7 Drawing Sheets

SYSTEMS AND METHODS FOR ADVANCED TARGETING

BACKGROUND

1. Field

The disclosure generally relates to testing systems for web page configurations, and more particularly, to an advanced targeting system for selecting and transmitting effective web configurations to users.

2. Related Art

Organizations depend on their websites for various business purposes. Website operators face challenges in maximizing the conversion rates and the effectiveness of the website, such as the number of consumers that make a purchase from the website, the number of people converting into card members with the organization, or the number that signup for newsletters etc. A website's conversion rate and/or the effectiveness is a measure of how successfully the website persuades users to act on what is offered by the website.

In order to determine an effectiveness of a website, the website is first tested amongst different users by presenting multiple versions of the website content and determining the most effective website version to be transmitted to the users when the website goes live. There are various methods for determining the effectiveness of the website content. One way to do so is by defining a plurality of sections within the web page and presenting specific sections only based on a user's profile or history with the website. Conventional systems and methods control one or more sections independently on the web page. However, none of the existing methods check for dependencies amongst the content and the sections of the web page. Therefore, the various webpage configurations are not effectively tested.

Thus, there is a need for a method, system and/or program for advanced targeting and providing the most relevant information to the user, in order to increase the conversion rate and the effectiveness of the website. Also, there is a need for a system that is able to test webpage content where the content of two sections may be dependent on each other.

SUMMARY

The present disclosure includes systems, methods, and articles of manufacture for testing webpage effectiveness. The method may comprise using a computer-based system to store a plurality of webpage configurations in a database. A first version of a first section of a webpage may be identified for testing. The computer-based system may determine that content of a second section of the webpage is dependent on content of the first section. The computer-based system may select a first version of the second section based on the first version of the first section, and transmit a first webpage configuration comprising the first version of the first section and the first version of the second section to a first web client. The transmitting may occur in response to receiving a request to access the webpage.

In various embodiments, the content of the second section may be selected dynamically based upon the content of the first section. The method may include determining that behavior of the second section is dependent on the content of the first section. The method may further include storing effectiveness data associated with the first webpage configuration. The effectiveness data may comprise at least one of number of user clicks, number of user enrollments, amount of time spent on the webpage, and user survey responses.

The method may further comprise transmitting a second webpage configuration comprising a second version of the first section and a second version of the second section to a second web client. The method may include storing effectiveness data associated with the second webpage configuration. The effectiveness data associated with the first webpage configuration may be compared with the effectiveness data associated with the second webpage configuration. The most effective webpage configuration may be selected to be displayed to users.

A tag may be associated with the first section. The tag may indicate that the second section is dependent on the first section. The content or behavior of the second section may be selected based upon the tag. The tag may comprise html. A tag may be associated with the second section. The tag may indicate that the second section is dependent on the first section.

In various embodiments, the webpage testing comprises multivariate testing. Results of the multivariate testing may be stored, and the results may be used to determine the most effective webpage configuration. The first section may comprise features of a transaction account, and the second section may comprise benefits associated with the features.

The method may further include receiving information associated with a user. The first version of the first section of the webpage to be tested may be identified based upon the information associated with the user. The information associated with the user may be stored and may be associated with effectiveness data associated with the first webpage configuration.

BRIEF DESCRIPTION OF THE DRAWINGS

The features and advantages of the disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "transaction account" may include any account that may be used to facilitate a financial transaction.

The systems, methods and computer program products disclosed in conjunction with various embodiments of the disclosure are embodied in systems and methods for advanced targeting. The phrase "advanced targeting" is only exemplary and used for descriptive purposes, and must not be construed to limit the scope of the disclosure.

Figure 1:
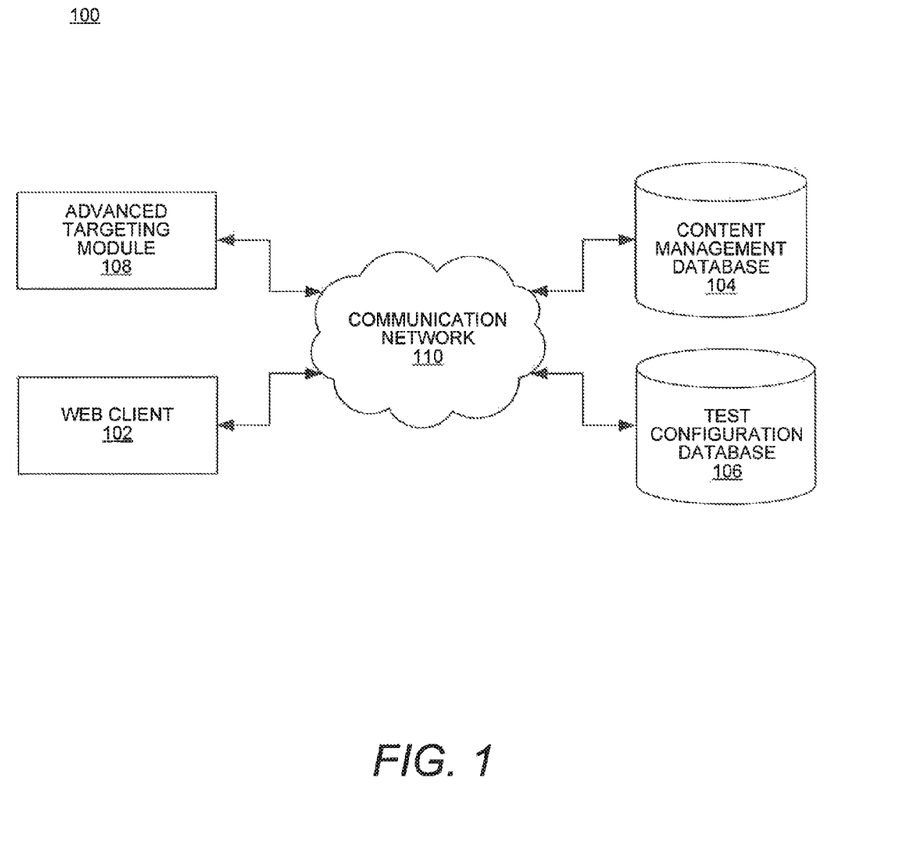
FIG. 1 is an environment in which an advanced targeting module may be deployed, according to various embodiments of the disclosure.

FIG. 1 shows an environment 100 in which the disclosure may be utilized, in accordance with various embodiments. Environment 100 may include at least one web client, such as a web client 102, at least one content management database, such as a content management database 104, a test configuration database 106, an advanced targeting module 108, and a communication network 110. Web client 102, content management database 104, test configuration database 106, and advanced targeting module 108 may communicate with each other over communication network 110. In various embodiments, advanced targeting module 108 may be configured to test the effectiveness of a web page configuration.

Examples of communication network 110 may include, but are not limited to, a wide area network (WAN), a local area network (LAN), an Ethernet, Internet, an Intranet, a cellular network, a satellite network, or any other suitable network for transmitting data, Communication network 110 may be implemented as a wired network, a wireless network or a combination thereof.

Web client 102 may include any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

Content management database 104 may store one or more web pages and the content of the web pages to be tested. Additionally, content management database 104 may store tagged versions of the content of the web pages for testing. For example, a web designer may store rules related to the web page, the content of the web page and tagging of the sections of the web page, in content management database 104. The tags may indicate the interdependencies between a plurality of sections within the web page. For example, the tags may be hypertext markup language (HTML) tags.

Test configuration database 106 may store the information associated with a user interaction with the web page. For example, the information may include, but is not limited to, user clicks, number of user enrollments, amount of time spent on the web page, and user survey responses, etc. Test configuration database 106 may be updated in real time by advanced targeting module 108. Web client 102 and advanced targeting module 108 may communicate with content management database 104 and test configuration database 106 through communication network 110.

Content management database 104 and test configuration database 106 may employ any type of database, such as relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via, a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of content management database 104 and test configuration database 106, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e,g, LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets, in one example, the data set annotation indicates that only the data set owner or the user are permitted to delete a data set, various identified users may be permitted to access the data set for reading, and others are altogether excluded from accessing the data set. However, other access restriction parameters may also he used allowing various entities to access a data set with various permission levels as appropriate.

The data, including the header or trailer may be received by a stand alone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

In various embodiments, advanced targeting module 108 may facilitate in identifying a first version of a first section of a web page to be tested. Advanced targeting module 108 may further determine that content of a first version of a second section is dependent on the first version of the first section of the web page. Further, advanced targeting module 108 may determine based on one or more tags associated with the first section and the second section. Further, advanced targeting module 108 may select the first version of the second section, based on the first version of the first section, and further based on the dependency of the second section on the first section. Subsequently, advanced targeting module 108 may transmit a first web page configuration to a first web client 102. The first web page configuration may include the first version of the first section and the first version of second section.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Figure 2:
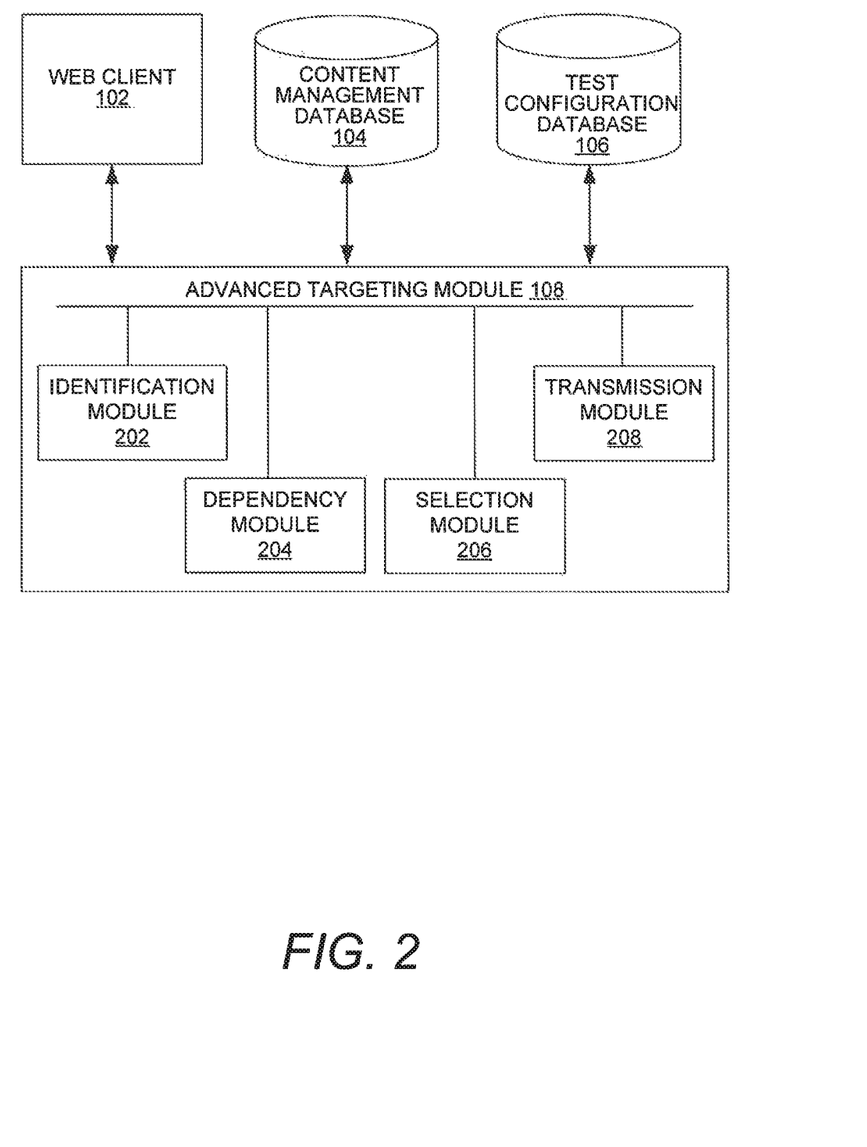
FIG. 2 is an implementation of the advanced targeting module for selecting and transmitting effective web configurations to users, according to various embodiments.

Referring to FIG. 2, advanced targeting module 108 is depicted, according to various embodiments of the disclosure. Advanced targeting module 108 may be configured to test an effectiveness of a web page configuration. As illustrated in FIG. 2, advanced targeting module 108 may include an identification module 202, a dependency module 204, a selection module 206, and a transmission module 208. Advanced targeting module 108 may be configured to communicate with content management database 104 and test configuration database 106 through communication network 110. However, in various embodiments, advanced targeting module 108 may be implemented on a server of a third party service provider. A user may communicate with advanced targeting module 108 through communication network 110.

In various embodiments, advanced targeting module 108 may be deployed on a server of a transaction account issuer (not shown in the figure). A user may access a web page associated with a transaction account, on an online interface associated with the transaction account issuer. For example, the user may select to view one amongst a plurality of types of transaction accounts. In an example, the transaction account web page may be a credit card information web page, a debit card information web page, a cash card information web page etc. As will be understood, advanced targeting module 108 may test different types of web page configurations transmitted to different users to obtain most effective web page configurations to be displayed to different types of consumers.

The content of the transaction account web page to be tested may be divided into one or more sections indicating different types of information associated with the transaction account. For example, for a selected card type, such as Gold Card, one section may indicate a plurality of features available for the Gold card in a "Features" section, and another section may indicate a plurality of benefits associated with the features of the Gold card, in a "Benefits" section, etc.

As will be understood by a person having ordinary skill in the art, the various sections within the web page configuration may be interdependent on each other. For example, the "Benefits" section may be dependent on the "Features" section, and the "Features" section may further be dependent on a "Card Type" section. The sections within the web page may have one or more associated tags indicating the interdependencies amongst them. For example, the tags may be HTML tags. Further, the content and the plurality of sections along with the associated tags within the transaction account web page may be stored in content management database 104. In various embodiments, a web designer may also store predefined rules for tagging the sections within the web page in content management database 104. Furthermore, the tagged versions as well as the rules for tagging the sections may be retrieved from the content management database 104 in the future for processing the web page configuration.

Advanced targeting module 108 may receive a request to access a web page. In response to receiving the request, identification module 202 within advanced targeting module 108 may identify a first section within the web page to be tested. For example, a first version of the "Features" section in the transaction account web page may be identified to be tested. Subsequently, the identification module 202 may identify a first version of the first section based on the information associated with the user requesting the access to the web page. For example, the user may select a desired card type or a desired transaction account type to view the related features and benefits. The identification module 202 may select the first version based on the consumer's IP address or purchase history.

Subsequently, dependency module 204 may identify the tags associated with the first version of the first section of the web page. Further, dependency module 204 may determine, based on the tags associated with the first section, that a second section is dependent on the first section. Advanced targeting module 108 may also associate tags with the second section to indicate that the second section is dependent on the first section. Further, the dependency module 204 may confirm the dependency of the second section on the first section based on the tags associated with the second section. For example, based on the tags associated with the "Features" section, dependency module 204 may determine that the "Benefits" section is dependent on the "Features" section. Subsequently, advanced targeting module 108 may associate tags with the "Benefits" section to indicate that the "Benefits" section is dependent on the "Features" section.

The second section may be content dependent and/or behavior dependent on the first section. For example, content dependency may indicate that the first section drives the content of the second section. The behavior dependency may indicate that the behavior of the second section changes with any change in the content of the first section. For example, if there are any additions or removals or modifications in the "Features" section, then the corresponding "Benefits" sections may need to be dynamically updated accordingly. Based on the content of the "Features" section, the corresponding behavior for the "Benefits" section may indicate that the benefits should be displayed in a list or as a drop-down menu. In various embodiments of the present disclosure, dependency module 204 identifies whether the second section is content dependent or behavior dependent on the first section, based on the tags associated with the first section.

Selection module 206 may select the second section based on the dependency determination. The content of the second section may be dynamically selected based on the content of the first section. For example, if the feature selected in the "Features" section is "Membership Rewards" then the content of the second section, i.e., the "Benefits" section may include information about the membership rewards associated with the transaction account of the consumer. For "Membership Rewards", or "Groceries" or "Travel Benefits" etc., in the "Features" section, the content of the "Benefits" section may include "3× reward points on Airline ticketing" and/or "2× reward points on Groceries" etc. Similarly, for a "Hotel Benefits" feature selected in the "Features" section, the "Benefits" section may include "10% off on Hotel Reservations".

Transmission module 208 may transmit the first version of the first section and the selected first version of the second section, in a first configuration of the web page to a first user communicating with advanced targeting module 108 through a first web client 102. The transmission of the first configuration of the web page may be in response to receiving a request to access the web page by a user. For example, the user may send a request to access the transaction account web page and select a desired transaction account type, such as "Credit Cards" or "Debit Cards" or "Charge Cards" etc., to view the related features and benefits. In response to the request by the user, transmission module 208 may transmit a first configuration of the transaction account web page, including the first version of the "Features" section and a first version of the corresponding dependent "Benefits" section. Furthermore, transmission module 208 may transmit a second web page configuration including a second version of the first section and a second version of the second section, to a second user communicating with advanced targeting module 108 through a second web client 102.

Similarly, different configurations of the transaction account web page may be transmitted to different users for testing the effectiveness of different web page configurations. Further, advanced targeting module 108 may use multivariate testing to obtain multivariate test results for the different web page configurations. As will be understood by a person having ordinary skill in the art, different configurations of the web pages may include different versions of the first sections and the second sections and so on.

Advanced targeting module 108 may monitor effectiveness data associated with the first web page configuration, a second web page configuration, and so on. For example, the effectiveness data may include user clicks, number of user enrollments, amount of time spent on the web page, user survey responses, etc. The effectiveness data associated with the different web page configurations may be stored in test configuration database 106. For example, the effectiveness data associated with the first web page configuration and further associated with a first user may be stored in the test configuration database 106 and the effectiveness data associated with the second web page configuration and further associated with the second user may be stored separately in the test configuration database 106. Additionally, the information associated with the first and the second user such as, the user login information, the user IDs etc., may be stored with the corresponding effectiveness data in the test configuration database 106.

Subsequently, advanced targeting module 108 may compare the effectiveness data associated with the different web page configurations to obtain a most effective web page configuration. For example, if the user response to the first web page configuration is better than as compared to that of the second web page configuration, then the first web page configuration is selected to be the effective web page configuration. Further, the obtained most effective web page configuration may be selected to be displayed to all the users. In various embodiments, the most effective web page configuration may be selected to be displayed to all users that share one or more characteristics with the users involved in the testing.

Referring now to FIGS. 3-6 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3-6, but also to the various system components as described above with reference to FIGS. 1 and 2.

Figure 3:
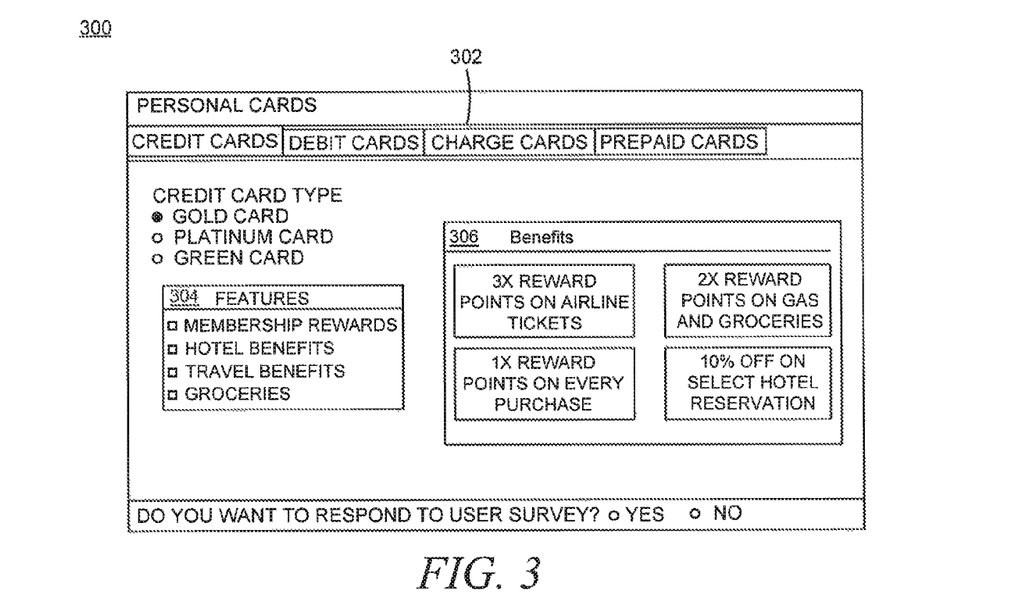
FIG. 3 is a screen shot of a first version of a web page configuration with a first version of a first section and a second section, on an example online interface of a transaction account issuer, according to various embodiments.

FIG. 3 is an illustration 300 illustrating a first version of a web page configuration with a first version of a first section and a first version of a second section. In various embodiments, advanced targeting module 108 may receive a request to access a transaction account issuer's website from a first user through a first web client 102. For example, the user may select a card type such as "Credit Card" from section 302 to view its related features and benefits. In response to selecting the "Credit Card" option in section 302, advanced targeting module 108 may display the type of Credit Card to be selected by the user. For example, for a Gold Card selected by the user, advanced targeting module 108 may display its related features and benefits in the first version of the first section and the first version of the second section. As illustrated in the current example, the first version of the first section may include a first version of the "Features" section 304. The "Features" section 304 may include "Membership Rewards", "Hotel Benefits", "Travel Benefits", and "Groceries". Further, for the first version of the "Features" section 304, advanced targeting module 108 may display the related first version of the second section, i.e., the "Benefits" section 306. In said example, the "Benefits" section 306 may include benefits related to the content in the "Features" section 304, such as "3× reward points on Airline Tickets", "2× reward points on Gas and Groceries", "1× reward points on every purchase", and "10% off on select hotel reservations", Also, advanced targeting module 108 may display a user survey message that a user may wish to respond to. As explained earlier, the user surveys may be used to determine effectiveness data associated with the first version of the web page configuration.

Figure 4:
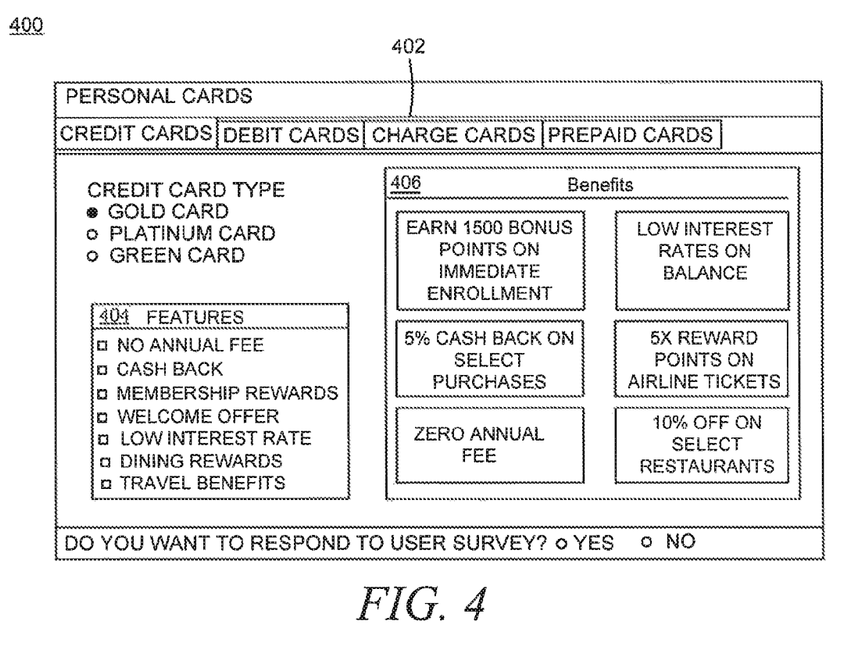
FIG. 4 is a screen shot of a second version of a web page configuration with a second version of a first section and a second section, on an example online interface of a transaction account issuer, according to various embodiments.

FIG. 4 is a screen shot 400 illustrating a second version of a web page configuration with a second version of a first section and a second version of a second section. On receiving a request from a user to access a transaction account issuer webpage, advanced targeting module 108 may display the corresponding features and benefits in the second versions of the first section and the second section. For example, the user may select a card type such as "Credit Card" from section 402 to view its related features and benefits. In response to selecting a. "Credit Card" from section 402, advanced targeting module 108 may display the type of Credit Card to be selected by the user. For example, for a Gold Card selected by the user, advanced targeting module 108 may display its related features and benefits in the second version of the first section and the second version of the second section. As illustrated in the current example, the second version of the first section may include the second version of the "Features" section 404. The "Features" section 404 may include "No Annual Fee", "Cash back", "welcome offer", "Low Interest rates", "Dining Rewards", and "Travel Benefits". As will be understood by a person having ordinary skill in the art, there may be changes in the second version of the "Features" section 404 as compared the first version of the "Features" section 304. Therefore, the second version of the second section, i.e., the second version of the "Benefits" section 406 may also be updated accordingly by advanced targeting module 108. Therefore, the second version of the "Benefits" section 406 may include "Earn 1500 bonus reward points on immediate enrollment", "Low Interest rates on balance", "5% cash back on select purchases", "5× reward points on Airline tickets", "10% off on select restaurants", and "Zero Annual Fee". The user may respond to the user surveys, and or enroll for the card if the user finds the offers attractive. The information associated with the user, such as the user survey response, user clicks, user enrollment for the card etc., may be stored in test configuration database 106 for determining the effectiveness data associated with the second web page configuration.

Figure 5:
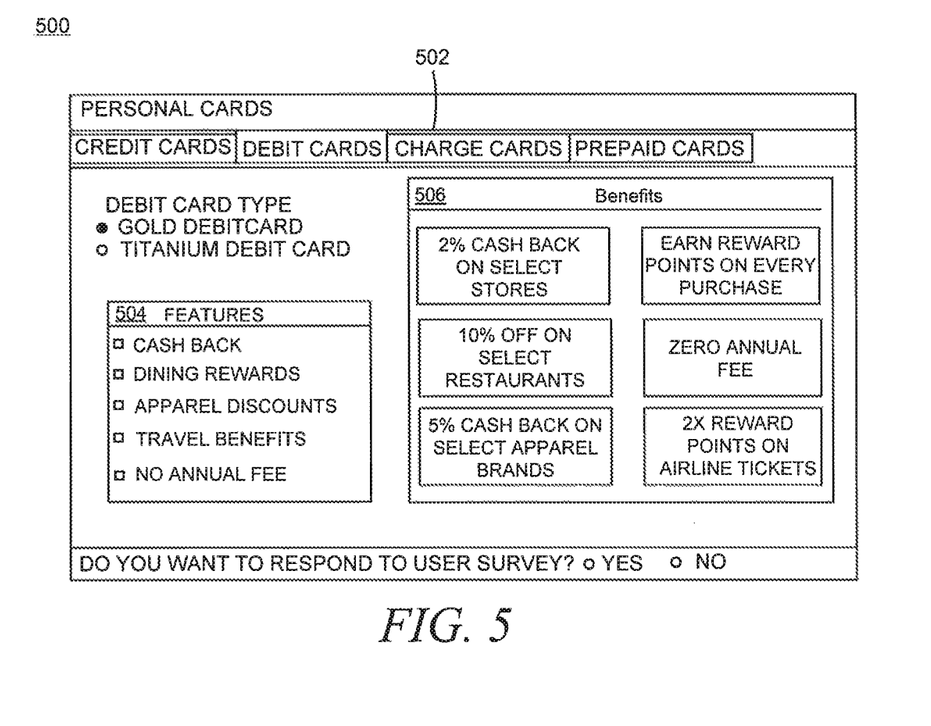
FIG. 5 is a screen shot of a third version of the web page configuration with a third version of a first section and a second section, on an example online interface of a transaction account issuer, according to various embodiments.

FIG. 5 is a screen shot 500 illustrating a third version of a web page configuration with a third version of a first section and a third version of a second section. For example, the user may select a card type such as "Debit Card" from section 502 to view its related features and benefits. In response to selecting a "Debit Card" from section 502, advanced targeting module 108 may display the type of Debit Card to be selected by the user. For example, for a Gold Debit Card selected by the user, advanced targeting module 108 may display its related features and benefits in the third version of the first section and the third version of the second section. As illustrated in the current example, the third version of the first section may include the third version of the "Features" section 504. The "Features" section 504 may include "Apparel discounts", "Cash back", "Dining Rewards", "No Annual Fee" and "Travel Benefits". As will be understood by a person having ordinary skill in the art, that there may be changes in the third version of the "Features" section 504 as compared the first and the second versions of the "Features" sections. Therefore, the third version of the second section, i.e., the third version of the "Benefits" section 506 may be updated accordingly by advanced targeting module 108. Therefore, the third version of the "Benefits" section 506 may include "2% cash back on select stores", "Earn reward points on every purchase", "5% cash back on select apparel brands", "2× reward points on Airline tickets", "10% off on select restaurants", and "Zero Annual Fee". Additionally, the user may respond to the user surveys, and or enroll for the card if the user finds the offers attractive. Furthermore, the information associated with the user, such as the user survey response, user clicks, user enrollment for the card etc., may be stored in test configuration database 106 for determining the effectiveness data associated with the third web page configuration.

Figure 6:
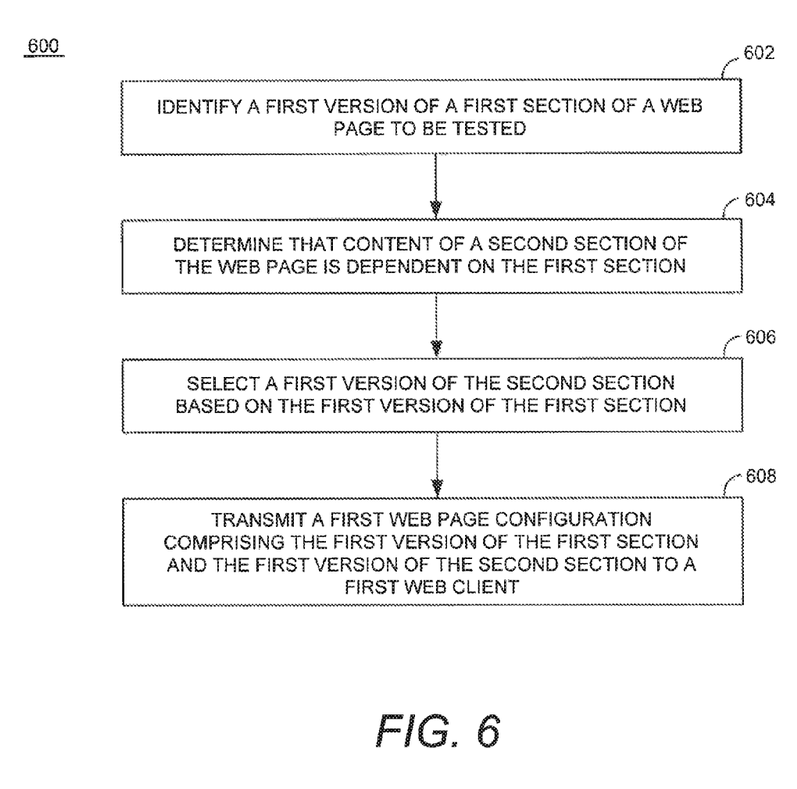
FIG. 6 is a flowchart illustrating one example process for selecting and transmitting effective web configurations to users, according to various embodiments.

FIG. 6 is a flow chart 600 illustrating one example process of advanced targeting method according to various embodiments. A computer based system may receive transaction account login credentials associated with a user on a secure area of a transaction account website. The transaction account website may include an online interface associated with a transaction account issuer. Further, the content of the transaction account web page to be tested is divided into one or more sections indicating different types of information associated with the transaction account. The computer based system further receives a request to access a web page configuration.

At step 602, a computer based system identifies a first version of a first section within the web page to be tested. The computer based system as described herein may include advanced targeting module 108. Advanced targeting module 108 may be implemented on a server of the transaction account issuer or on a third party service provider. Subsequently the computer based system identifies one or more tags associated with the first version of the first section of the web page. Further, computer based system may store the tags associated with the first version of the first section of the web page in a content management database 104 for future retrieval.

At step 604, the computer based system determines that a content of a second section of the web page is dependent on the first section. The computer based system may associate tags with the second section to indicate that the second section is dependent on the first section. Further, the associated tags may confirm the dependency of the second section on the first section. Additionally, the second section may be content dependent and/or behavior dependent on the first section of the web page. Furthermore, computer based system may store the tags associated with the second section in the content management database 104

In response to the determination, in step 606, the computer based system may select the first version of the second section based on the first section. Further, computer based system may dynamically select the content of the second section based on the content of the first section.

At step 608, the computer based system may transmit the first version of the first section and the selected first version of the second section, in a first configuration of the transaction account web page to a first user. The user may communicate with the computer based system through a first web client 102. Similarly, the computer based system may transmit different configurations of the transaction account web page to different users for testing the effectiveness of different web page configurations. The computer based system may use multivariate testing to obtain multivariate test results for the different web page configurations. The different configurations of the web pages may include different versions of the first sections and the second sections and so on.

The computer based system may monitor effectiveness data associated with the first web page configuration, a second web page configuration, and so on. The effectiveness data associated with the different web page configurations may be compared to obtain a most effective web page configuration. Consequently, the obtained most effective web page configuration may be selected to be displayed to all the users when the web page goes live. In various embodiments, the most effective web page configuration may be selected to be displayed to all users that share one or more characteristics with the users involved in the testing. In various embodiments, the computer based system may store the effectiveness data associated with the different web page configurations in a test configuration database 106

The present disclosure (i.e., Default Payment Setting Module, process 600, any part(s) or function(s) thereof) may be implemented using hardware, software or a combination thereof, and may be implemented in one or more computer systems or other processing systems. However, the manipulations performed by the disclosure were often referred to in terms, such as comparing or checking, which are commonly associated with mental operations performed by a human operator. No such capability of a human operator is necessary, or desirable in most cases, in any of the operations described herein, which form a part of the system. Rather, the operations are machine operations. Useful machines for performing the operations in the system may include general-purpose digital computers or similar devices.

In fact, in accordance with various embodiments of the present system, the present system is directed towards one or more computer systems capable of carrying out the functionality described herein.

Figure 7:
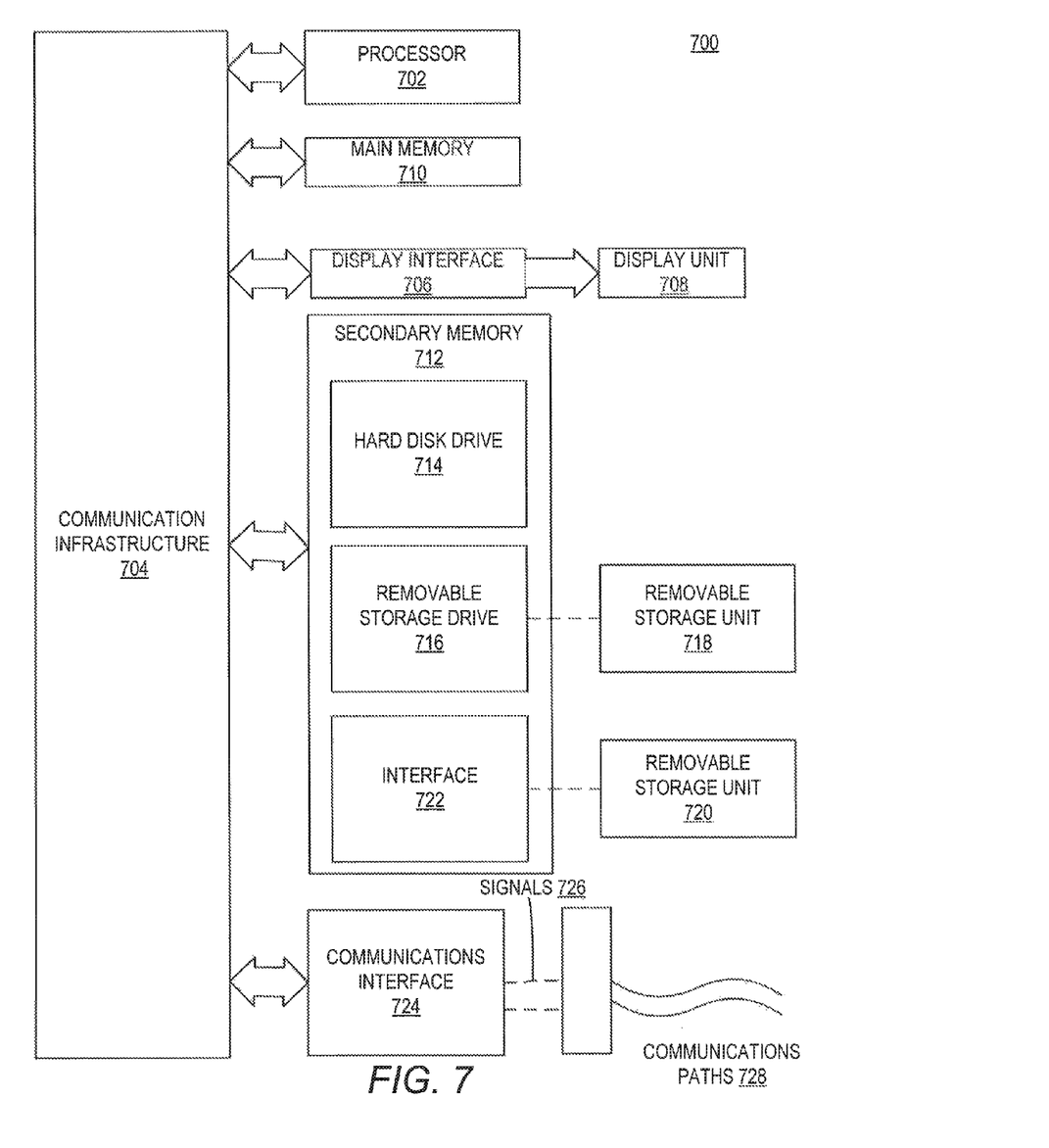
FIG. 7 is a block diagram of an exemplary computer system, according to various embodiments.

The computer system 700 includes at least one processor, such as a processor 702. Processor 702 is connected to a communication infrastructure 704, for example, a communications bus, a cross over bar, a network, and the like. Various software embodiments are described in terms of this exemplary computer system 700. After reading this description, it will become apparent to a person skilled in the relevant art(s) how to implement the system using other computer systems and/or architectures.

The computer system 700 includes a display interface 706 that forwards graphics, text, and other data from the communication infrastructure 704 for display on a display unit 708.

The computer system 700 further includes a main memory 710, such as random access memory (RAM), and may also include a secondary memory 712. The secondary memory 712 may further include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a well known manner. The removable storage unit 718 may represent a floppy disk, magnetic tape or an optical disk, and may be read by and written to by the removable storage drive 716. As will be appreciated, the removable storage unit 718 includes a computer usable storage medium having stored therein, computer software and/or data.

In accordance with various embodiments of the system, the secondary memory 712 may include other similar devices for allowing computer programs or other instructions to be loaded into the computer system 700. Such devices may include, for example, a removable storage unit 720, and an interface 722. Examples of such may include a program cartridge and cartridge interface (such as that found in video game devices), a removable memory chip (such as an erasable programmable read only memory (EPROM), or programmable read only memory (PROM)) and associated socket, and other removable storage units 720 and interfaces 722, which allow software and data to be transferred from the removable storage unit 720 to the computer system 700.

The computer system 700 may further include a communication interface 724. The communication interface 724 allows software and data to be transferred between the computer system 700 and external devices. Examples of the communication interface 724 include, but may not be limited to a modem, a network interface (such as an Ethernet card), a communications port, a Personal Computer Memory Card International Association (PCMCIA) slot and card, and the like. Software and data transferred via the communication interface 724 are in the form of a plurality of signals, hereinafter referred to as signals 726, which may be electronic, electromagnetic, optical or other signals capable of being received by the communication interface 724. The signals 726 are provided to the communication interface 724 via a communication path (e.g., channel) 728. The communication path 728 carries the signals 726 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 716, a hard disk installed in hard disk drive 714, the signals 726, and the like. These computer program products provide software to the computer system 700. The disclosure is directed to such computer program products.

Computer programs (also referred to as computer control logic) are stored in the main memory 710 and/or the secondary memory 712. Computer programs may also be received via the communication interface 704. Such computer programs, when executed, enable the computer system 700 to perform the features of the disclosure, as discussed herein. In particular, the computer programs, when executed, enable the processor 702 to perform the features of the disclosure. Accordingly, such computer programs represent controllers of the computer system 700.

In accordance with various embodiments, where the system is implemented using software, the software may be stored in a computer program product and loaded into the computer system 700 using the removable storage drive 716, the hard disk drive 714 or the communication interface 724. The control logic (software), when executed by the processor 702, causes the processor 702 to perform the functions of the system as described herein.

In various embodiments, the system may be implemented primarily in hardware using, for example, hardware components such as application specific integrated circuits (ASIC). Implementation of the hardware state machine so as to perform the functions described herein will he apparent to persons skilled in the relevant art(s).

In various embodiments, the system is implemented using a combination of both the hardware and the software.

While various embodiments of the disclosure have been described above, it should be understood that they have been presented by way of example, and not limitation. It will be apparent to persons skilled in the relevant art(s) that various changes in form and detail can be made therein without departing from the spirit and scope of the disclosure. Thus, the disclosure should not be limited by any of the above described exemplary embodiments, but should be defined only in accordance with the following claims and their equivalents.

In addition, it should be understood that the figures illustrated in the attachments, which highlight the functionality and advantages of the disclosure, are presented for example purposes only. The architecture of the system is sufficiently flexible and configurable, such that it may be utilized (and navigated) in ways other than that shown in the accompanying figures.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an Internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

In various embodiments, the methods described herein are implemented using the various particular machines described herein. The methods described herein may be implemented using the described particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

In various embodiments, the server may include application servers (e.g. WEB SPHERE, WEB LOGIC, MOSS). In various embodiments, the server may include web servers (e.g. APACHE, IIS, GWS, SUN JAVA SYSTEM WEB SERVER).

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perk PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

As used herein, "transmit" may include sending electronic data from one system component to another over a network connection. Additionally, as used herein, "data" may include encompassing information such as commands, queries, files, data for storage, and the like in digital or any other form.

The phrases consumer, customer, user, account holder, cardmember or the like shall include any person, entity, government organization, business, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in Re Nuyten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the disclosure in any way.

I claim:

1. A computer-implemented method comprising:
identifying, by a computer-based system for testing webpage effectiveness, a first version of a first section of a webpage to be tested;
retrieving, by the computer-based system, the first version of the first section, wherein the first version comprises a first tag indicating that content of a second section of the webpage is dependent on content of the first section, and wherein the second section comprises a second tag indicating that the content of the second section is dependent on the content of the first section;
determining, by the computer-based system and based on the first tag, that the content of the second section of the webpage is dependent on the content of the first section;
selecting, by the computer-based system, a first version of the second section based on the first version of the first section;
transmitting, by the computer-based system, a first webpage configuration comprising the first version of the first section and the first version of the second section to a first web client;
modifying, by the computer-based system, the content of the second section; and
modifying, by the computer-based system and in response to the modifying the content of the second section, the content of the first section based on the second tag indicating that the content of the second section is dependent on the content of the first section.

2. The method of claim 1, wherein the content of the second section is selected dynamically based upon the content of the first section.

3. The method of claim 1, wherein the transmitting occurs in response to receiving a request to access the webpage.

4. The method of claim 1, further comprising determining, by the computer-based system, behavior of the second section is dependent on the content of the first section.

5. The method of claim 1, further comprising monitoring, by the computer-based system, the web client to obtain effectiveness data associated with at least one of the first webpage configuration or a second webpage configuration.

6. The method of claim 5, wherein the effectiveness data comprises at least one of number of user clicks, number of user enrollments, amount of time spent on the webpage, or user survey responses.

7. The method of claim 1, further comprising transmitting, by the computer-based system, a second webpage configuration comprising a second version of the first section and a second version of the second section to a second web client.

8. The method of claim 7, further comprising comparing, by the computer-based system, the effectiveness data associated with the first webpage configuration with the effectiveness data associated with the second webpage configuration.

9. The method of claim 8, further comprising selecting, by the computer-based system and based on the comparison, a most effective webpage configuration to be displayed to users.

10. The method of claim 1, further comprising storing, by the computer-based system, a plurality of webpage configurations in a database.

11. The method of claim 1, further comprising associating, by the computer-based system, the first tag with the first section.

12. The method of claim 11, wherein a behavior of the second section is selected based upon the first tag.

13. The method of claim 11, wherein the first tag comprises html.

14. The method of claim 1, wherein the second tag indicates that a behavior of the second section is dependent on the first section.

15. The method of claim 1. further comprising storing, by the computer-base system, multivariate test results.

16. The method of claim 1, further comprising receiving, by the computer-based system, information associated with a user, wherein the identifying the first version of the first section of the webpage to be tested is based upon the information associated with the user.

17. The method of claim 16, further comprising storing, by the computer-based system, the information associated with the user, and associating the information associated with the user with effectiveness data associated the first webpage configuration.

18. The method of claim 1, wherein the first section comprises features of a transaction account, and wherein the second section comprises benefits associated with the features.

19. An article of manufacture including a non-transitory, tangible computer readable storage medium having instructions stored thereon that, in response to execution by a computer-based system for testing webpage effectiveness, cause the computer-based system to perform operations comprising;
identifying, by the computer-based system, a first version of a first section of a webpage to be tested;
retrieving, by the computer-based system, the first version of the first section, wherein the first version comprises a first tag indicating that content of a second section of the webpage is dependent on content of the first section, and wherein the second section comprises a second tag indicating that the content of the second section is dependent on. the content of the first section;
determining, by the computer-based system and based on the first tag, that the content of the second section of the webpage is dependent on the content of the first section;
selecting, by the computer-based system, a first version of the second section based on the first version of the first section;
transmitting, by the computer-based system, a first webpage configuration comprising the first version of the first section and the first version of the second section to a first web client;
modifying, by the computer-based system, the content of the second section; and
modifying, by the computer-based system and in response to the modifying the content of the second section, the content of the first section based on the second tag indicating that the content of the second section is dependent on the content of the first section.

20. A system comprising:
a processor for testing webpage effectiveness,
a tangible, non-transitory memory configured to communicate with the processor,
the tangible, non-transitory memory having instructions stored thereon that, in response to execution by the processor, cause the processor to perform operations comprising:
identifying, by the processor, a first version of a first section of a webpage to be tested;
retrieving, by the processor, the first version of the first section, wherein the first version comprises a first tag indicating that content of a second section of the webpage is dependent on content of the first section, and wherein the second section comprises a second tag indicating that the content of the second section is dependent on the content of the first section;

determining, by the processor and based on the first tag, that the content of the second section of the webpage is dependent on the content of the first section;

selecting, by the processor, a first version of the second section based on the first version of the first section;

transmitting, by the processor, a first webpage configuration comprising the first version of the first section and the first version of the second section to a first web client;

modifying, by the processor, the content of the second section; and modifying, by the processor and in response to the modifying the content of the second section, the content of first section based on the second tag indicating that the content of the second section is dependent on the content of the first section.

* * * * *